(12) United States Patent  
Kunieda

(10) Patent No.: US 11,295,094 B2  
(45) Date of Patent: Apr. 5, 2022

(54) READER DEVICE AND IDENTIFICATION DEVICE

(71) Applicant: Mitsubishi Electric Corporation, Chiyoda-ku (JP)

(72) Inventor: Tatsuya Kunieda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/638,691

(22) PCT Filed: Oct. 2, 2018

(86) PCT No.: PCT/JP2018/036899  
§ 371 (c)(1),  
(2) Date: Feb. 12, 2020

(87) PCT Pub. No.: WO2019/069932  
PCT Pub. Date: Apr. 11, 2019

(65) Prior Publication Data  
US 2021/0192153 A1    Jun. 24, 2021

(30) Foreign Application Priority Data  
Oct. 5, 2017   (JP) .............................. JP2017-195210

(51) Int. Cl.  
*G06K 7/08*    (2006.01)  
*G06K 7/10*    (2006.01)  
*G06K 7/14*    (2006.01)

(52) U.S. Cl.  
CPC ......... *G06K 7/084* (2013.01); *G06K 7/10861* (2013.01); *G06K 7/1417* (2013.01); *G06K 2007/10504* (2013.01)

(58) Field of Classification Search  
CPC .. G06K 7/084; G06K 7/1417; G06K 7/10861; G06K 2007/10504  
See application file for complete search history.

(56) References Cited

U.S. PATENT DOCUMENTS

2011/0188095 A1    8/2011  Shiraishi  
2016/0335825 A1*  11/2016  Nishino ................... B65H 5/38

FOREIGN PATENT DOCUMENTS

JP    57-71084 A    5/1982  
JP    58-36069 A    3/1983  
(Continued)

OTHER PUBLICATIONS

International Search Report dated Dec. 25, 2018 in PCT/JP2018/036899 filed on Oct. 2, 2018, 2 pages.

(Continued)

*Primary Examiner* — Matthew Mikels  
(74) *Attorney, Agent, or Firm* — Oblon, McClelland, Maier & Neustadt, L.L.P.

(57) ABSTRACT

An input and output controller transmits timing signals respectively to sensor modules based on unit conveyance distances of the respective sensor modules and a predetermined order of the sensor module. The sensor modules reads, in response to the timing signals, identification information included in an object and respectively generates read data and. The input and output controller acquires the read data respectively generated by the sensor modules and respectively outputs the read data in the predetermined order.

19 Claims, 12 Drawing Sheets

(56) References Cited

FOREIGN PATENT DOCUMENTS

| JP | 9-37041 A | 2/1997 |
|---|---|---|
| JP | 2000-151907 A | 5/2000 |
| JP | 2010-152611 A | 7/2010 |
| JP | 2010-171957 A | 8/2010 |
| JP | 2011-160362 A | 8/2011 |
| JP | 2013-206440 A | 10/2013 |

OTHER PUBLICATIONS

Notice of Reasons for Refusal dated Nov. 12, 2019 in Japanese Patent Application No. 2019-545377 (with unedited computer-generated English translation), 27 pages.

\* cited by examiner

READER DEVICE AND IDENTIFICATION DEVICE

TECHNICAL FIELD

The present disclosure relates to a reading device that reads identification information included in an object to be read, and an identification device including the reading device.

BACKGROUND ART

A bank bill includes multiple types of security information, such as optical information and magnetic information. A device such as a bank bill identification device and a bank bill discrimination device includes a plurality of sensor modules each corresponding to one of the multiple types of security information. An example of a bank bill identification device of this kind is disclosed in Patent Literature 1. The bank bill identification device disclosed in Patent Literature 1 identifies the denomination and checks the authentic-counterfeit status of a bank bill by synthesizing images obtained by a line sensor, a magnetic sensor, and a UV sensor and comparing the synthesized image with an image previously registered.

CITATION LIST

Patent Literature

Patent Literature 1: Unexamined Japanese Patent Application Kokai Publication No. 2013-206440

SUMMARY OF INVENTION

Technical Problem

As the number of image pixels output by each of the sensors, the reading period of each sensor, and the timing of the reading are different for the sensors included in the bank bill identification device disclosed in Patent Literature 1, this bank bill identification device includes interfaces used exclusively by respective sensors. Thus, the structure of the bank bill identification device is complicated.

An objective of the present disclosure, which is made to solve the above problem, is to provide a reading device and an identification device having simple configuration.

Solution to Problem

In order to attain the aforementioned objective, a reading device according to the present disclosure includes sensor modules and an input and output controller. The sensor modules each, in response to a corresponding timing signal, reads identification information held by an object that is to be read and generate read data, the timing signal being transmitted to the corresponding sensor module. The input and output controller transmits the timing signal to the corresponding sensor module based on a unit conveyance distance determined for the corresponding sensor module and the predetermined order of the sensor module, acquires the read data generated by the corresponding sensor module, and outputs the read data that corresponds to the corresponding sensor module in the predetermined order, the timing signal commanding start of reading the object each time the object is conveyed over the unit conveyance distance of the corresponding sensor module.

Advantageous Effects of Invention

A reading device according to the present disclosure generates read data in response to a timing signal based on a unit conveyance distance determined for the corresponding sensor module and the predetermined order of the sensor modules. This reading device further outputs the read data respectively to the sensor modules in the predetermined order. Since there is no need to provide the interfaces that corresponds to the respective sensor modules, the reading device has a simple configuration compared to a reading device known in the related art including the interfaces that correspond to the sensor modules.

DESCRIPTION OF EMBODIMENTS

The reading device according to embodiments of the present disclosure is hereinafter described with reference to the drawings. Throughout the drawings, the same or similar components are denoted by the same reference signs.

Embodiment 1

Figure 1:
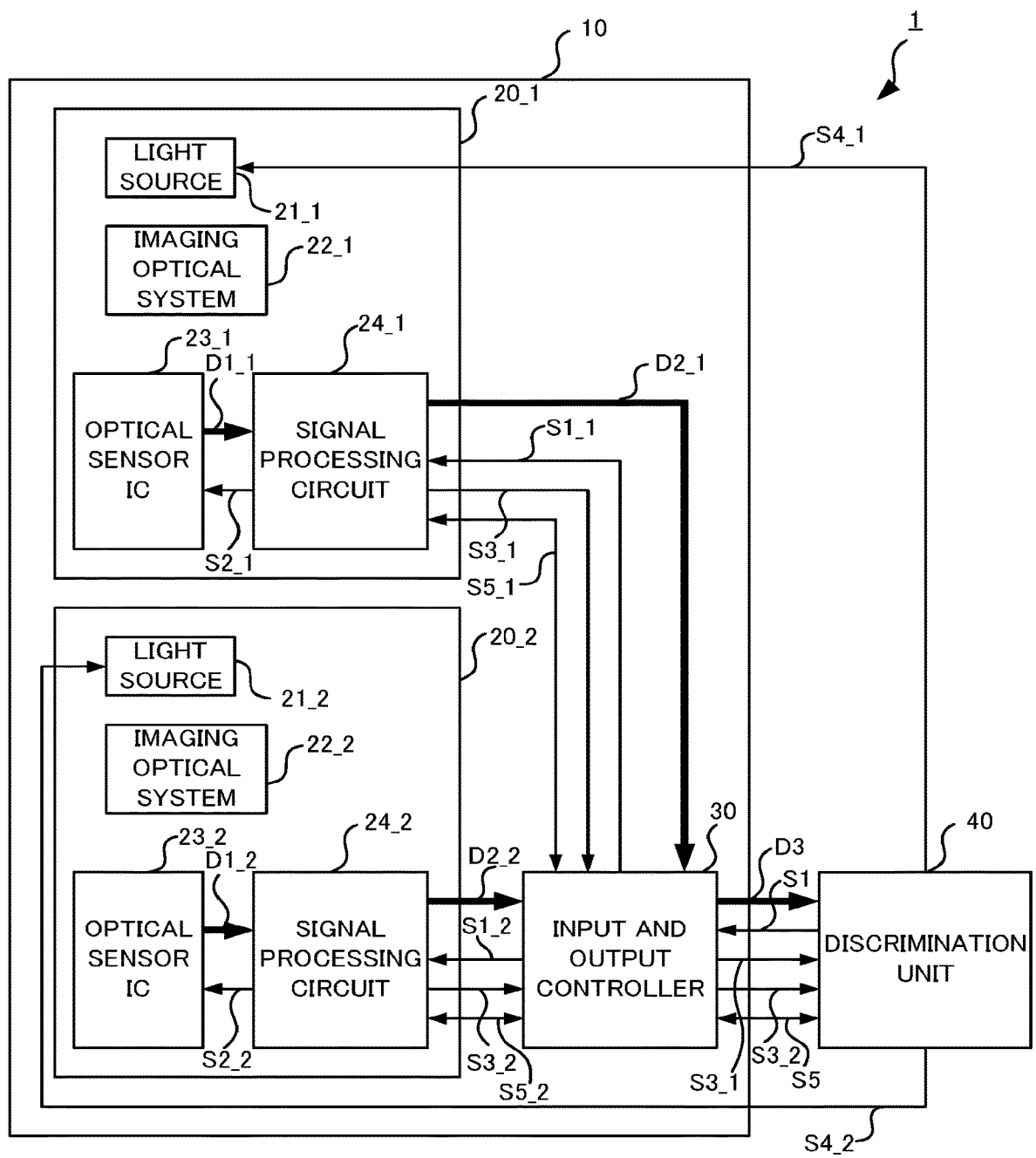
FIG. 1 is a block diagram illustrating a configuration of an identification device according to Embodiment 1 of the present disclosure.

As an example of an identification device according to Embodiment 1, an identification device that reads, with an optical sensor, optical characteristics of a bank bill that is an object and identifies the bank bill is described. Note that the object is conveyed through a conveyance path. A system configuration of an identification device 1 according to Embodiment 1 is illustrated in FIG. 1. In FIG. 1, thick solid lines indicate flow of data that is read while thin solid lines indicate control signals. The identification device 1 includes a reading device 10 that reads identification information of the object and outputs read data, and a discrimination unit 40 that identifies the object based on the read data that is output by the reading device 10. The reading device 10 includes a sensor module 20_1 that, in response to a timing signal S1_1 indicating a timing for reading, reads identification information of the object to generate read data D2_1, and a sensor module 20_2 that, in response to a timing signal S1_2 indicating a timing for reading, reads identification information of the object to generate read data D2_2. The reading device 10 further includes an input and output controller 30 that transmits the timing signals S1_1 and S1_2 respectively to the sensor modules 20_1 and 20_2, acquires the read data D2_1 and D2_2 generated respectively by the sensor modules 20_1 and 20_2, and outputs the read data sequentially in the order indicated by an instruction signal S1 acquired from the discrimination unit 40. The discrimination unit 40 holds information indicating the output order of the read data D2_1 and D2_2 to be output by the input and output controller 30, and transmits the instruction signal S1 to the input and output controller 30 based on the held information indicating the output order of the read data D2_1 and D2_2.

The sensor module 20_1 includes, for example, a contact image sensor (CIS) that detects visible light. Specifically, the sensor module 20_1 includes a light source 21_1 that radiates light within a radiation range, an imaging optical system 22_1 that forms, on an image pickup element, an image of light irradiated by the light source 21_1 and scattered on the object, an optical sensor IC 23_1 that is a linear sensor array generating image data D1_1, and a signal processing circuit 24_1 that performs signal processing, such as amplification processing, A-D conversion, and image correction processing with respect to the image data D1_1 and generates the read data D2_1.

The light source 21_1 includes a light-emitting diode (LED). Switching to turn ON or OFF the LED is performed when, in response to a connection control signal S4_1, which is later described, a cathode of the LED connects to the ground (GND) or the cathode of the LED is opened. The imaging optical system 22_1 forms, on the image pickup element included in the optical sensor IC 23_1, an image of light scattered on a bank bill. The optical sensor IC 23_1 acquires a start signal S2_1 synchronized with the timing signal S1_1 from the signal processing circuit 24_1, and performs a reading operation in response to the start signal S2_1. Specifically, the optical sensor IC 23_1 detects the rise in the start signal S2_1, starts the reading operation, and transmits the image data D1_1 generated by the reading operation to the signal processing circuit 24_1. The signal processing circuit 24_1 acquires the timing signal S1_1 from the input and output controller 30, generates the start signal S2_1 synchronized with the timing signal S1_1, and transmits the generated signal to the optical sensor IC 23_1. Furthermore, the signal processing circuit 24_1 transmits, to the input and output controller 30, an LED control signal S3_1 commanding the turning ON or the turning OFF of the LEDs. In addition, the signal processing circuit 24_1 performs signal processing, such as amplification processing, A-D conversion, and image correction processing with respect to the image data D1_1, generates the read data D2_1, and transmits the generated data to the input and output controller 30. The signal processing circuit 24_1 and the input and output controller 30 perform serial communication by mutually transmitting and receiving a serial communication signal group S5_1.

The sensor module 20_2, as the sensor module 20_1, includes a light source 21_2 that radiates light within a radiation range, an imaging optical system 22_2 that forms, on an image pickup element, an image of light irradiated by the light source 21_2 and scattered on the object, an optical sensor IC 23_2 that is a linear sensor array generating image data D1_2, and a signal processing circuit 24_2 that performs signal processing, such as amplification processing, A-D conversion, and image correction processing with respect to the image data D1_2 and generates the read data D2_2.

Operation of each section of the sensor module 20_2 is the same as that of a section of the sensor module 20_1. Specifically, a light source 21_2 includes the LED. Switching to turn ON or OFF the LED is performed when, in response to a connection control signal S4_2, which is later describe, a cathode of the LED connects to the GND or the cathode of the LED is opened. The optical sensor IC 23_2 acquires a start signal S2_2 synchronized with the timing signal S1_2 from the signal processing circuit 24_2, and performs a reading operation in response to the start signal S2_2. The signal processing circuit 24_2 acquires the timing signal S1_2 from the input and output controller 30, generates the start signal S2_2 synchronized with the timing signal S1_2, and transmits the generated signal to the optical sensor IC 23_2. Furthermore, the signal processing circuit 24_2 transmits, to the input and output controller 30, an LED control signal S3_2 commanding the turning ON and turning OFF of the LEDs. In addition, the signal processing circuit 24_2 performs signal processing, such as amplification processing, A-D conversion, and image correction processing with respect to the image data D1_2, generates the read data D2_2, and transmits the generated data to the input and output controller 30. The signal processing circuit 24_2 and the input and output controller 30 perform serial communication by mutually transmitting and receiving a serial communication signal group S5_2.

Figure 2:
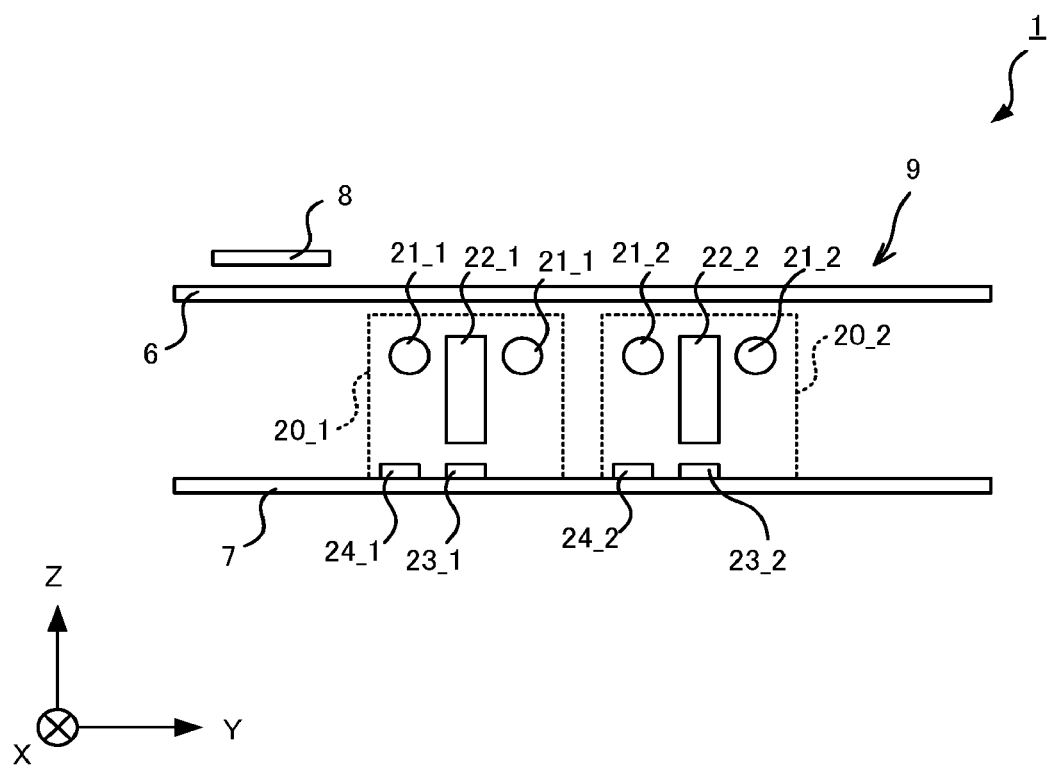
FIG. 2 is a diagram illustrating an example arrangement of sensor modules according to Embodiment 1.

The sensor modules 20_1 and 20_2, as illustrated in FIG. 2, are arranged facing a conveyance path 9 where the object 8 is to be conveyed, with a transparent plate 6 interposed between the conveyance path 9 and the sensor module 20_1 and between the conveyance path 9 and the sensor module 20_2. In FIG. 2, an X-axis direction, a Y-axis direction, and a Z-axis direction respectively indicate a main scanning direction, a conveyance direction of the object 8, and a vertical direction. Note that the X-axis, the Y-axis and the Z-axis are orthogonal to one another. For ease of understanding, in FIG. 2, the descriptions of the input and output controller 30 and discrimination unit 40 are omitted. The object 8 is conveyed through the conveyance path 9 in the positive Y-axis direction. Specifically, the object 8 first passes vertically above of the sensor module 20_1, and further passes vertically above the sensor module 20_2. The sensor module 20_1 includes two light sources 21_1 spaced apart in the Y-axis direction, an imaging optical system 22_1 located in the space between the two light sources 21_1, an optical sensor IC 23_1 disposed on a substrate 7 and a signal processing circuit 24_1 disposed on the substrate 7. The sensor module 20_2 has the same component arrangement as that of sensor module 20_1.

A distance of conveyance of the object 8 while the sensor module 20_1 having the above configuration performs a reading operation for one line, is defined as a unit conveyance distance of the sensor module 20_1. In other words, a period required for reading of the one line is identified based on the unit conveyance distance of the sensor module 20_1. The same also applies to the sensor module 20_2, that is, a distance of conveyance of the object 8 while the sensor module 20_2 performs the reading operation of one line is defined as a unit conveyance distance of the sensor module 20_2. The input and output controller 30 as illustrated in FIG. 1 acquires, from the discrimination unit 40, an instruction signal S1 indicating an output order of the read data, and transmits the timing signal S1_1 and the timing signal S1_2 respectively to the signal processing circuit 24_1 of the sensor module 20_1 and the signal processing circuit 24_2 of the sensor module 20_2, based on the unit conveyance distances of the sensor modules 20_1 and 20_2 and in response to the instruction signal S1. After acquiring the read data from the input and output controller 30, the discrimination unit 40 performs detection of the kind of a bank bill, discrimination between authentic and counterfeit bank bills, and the like by comparing the acquired data with the image previously registered.

Figure 3:
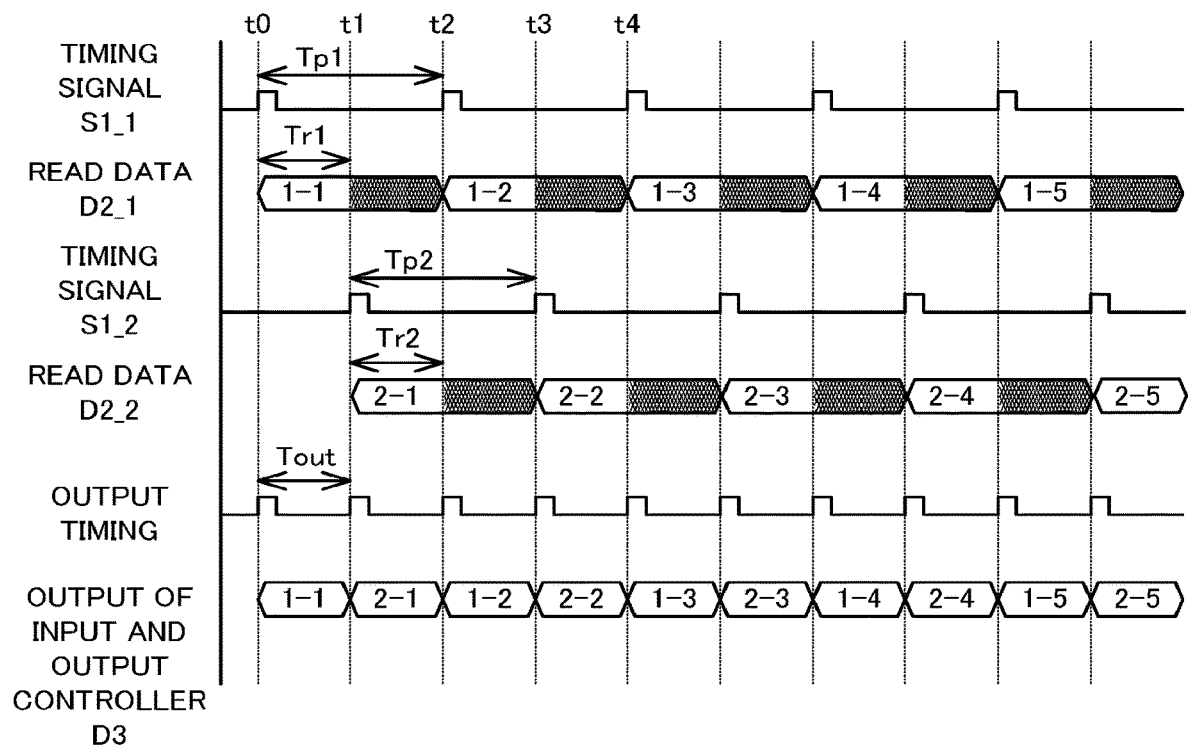
FIG. 3 is a timing chart indicating output of a reading device according to Embodiment 1.

The operation of the identification device 1 including the above configuration is described with reference to the timing chart illustrated in FIG. 3. The operation of the identification device 1 is described, as an example, with reference to the case where the discrimination unit 40 transmits, to the input and output controller 30, the instruction signal S1 indicating alternately outputting of the read data of the sensor module 20_1 for one line and the read data of sensor module 20_2 for one line. The input and output controller 30 generates the timing signal S1_1 that is a pulse signal for a cycle Tp1 and the timing signal S1_2 that is a pulse signal for a cycle Tp2, based on the unit conveyance distances of the sensor modules 20_1 and 20_2 and in response to the instruction signal S1. The input and output controller 30 generates the timing signals S1_1 and S1_2 so that the timing of the rise of a pulse of the timing signal S1_1 and the timing of the rise of a pulse of the timing signal S1_2 differ from each other.

The case where the sensor modules 20_1 and 20_2 have the same unit conveyance distance while a reading period Tr1 of the sensor module 20_1 and a reading period Tr2 of the sensor module 20_2 are the same is described as an example. The input and output controller 30 generates the timing signal S1_1 having the cycle Tp1 twice as long as the reading period Tr1, and the timing signal S1_2 having the cycle Tp2 twice as long as the reading period Tr2. Since the sensor modules 20_1 and 20_2 have the same unit conveyance distance and the reading period Tr1 of the sensor module 20_1 and the reading period Tr2 of the sensor module 20_2 are the same to each other, the cycle Tp1 of the timing signal S1_1 and the cycle Tp2 of the timing signal S1_2 are the same to each other. The timing signal S1_1 is the pulse signal that rises every cycle Tp1 at times t0, t2, t4 . . . , while the timing signal S1_2 is the pulse signal that rises every cycle Tp2 at time t1, t3, . . . .

Upon detection of the rise of the pulse of the timing signal S1_1 at the time t0, the sensor module 20_1 starts the reading operation and outputs the read data D2_1. In FIG. 3, "1-1" indicated in the field of the read data D2_1 indicates the read data D2_1 that is based on the image data D1_1 for one line read by the first reading operation of the optical sensor IC 23_1. That is, the sensor module 20_1 sequentially outputs from the time t0 to the time t1, to the input and output controller 30, the read data D2_1 generated by the first reading operation. After this, similarly at the times t2 and t4, the sensor module 20_1 starts the reading operation for every detection of the rise of the pulse of the timing signal S1_1 and outputs the read data D2_1. In FIG. 3, "1-2" indicated in the field of the read data D2_1 indicates the read data D2_1 that is based on the image data D1_1 for one line read by the second reading operation of the optical sensor IC 23_1. Similarly, "1-3", "1-4", and "1-5" indicated in the field of the read data D2_1 each indicate the read data D2_1 that are based on the image data D1_1 for one line read by the third, fourth, and fifth reading operations of the optical sensor IC 23_1.

Upon detection of the rise of the pulse of the timing signal S1_2 at the time t1, the sensor module 20_2 starts the reading operation and outputs the read data D2_2. In FIG. 3, "2-1" indicated in the field of the read data D2_2 indicates the read data D2_2 that is based on the image data D1_2 for one line read by the first reading operation of the optical sensor IC 23_2. That is, the sensor module 20_2 sequentially outputs from the time t1 to the time t2, to the input and output controller 30, the read data D2_2 generated by the first reading operation. After this, similarly at the time t3, the sensor module 20_2 starts the reading operation for every detection of the rise of the pulse of the timing signal S1_2 and outputs the read data D2_2. In FIG. 3, "2-2" indicates the read data D2_2 that is based on the image data D1_2 for one line read by the second reading operation of the optical sensor IC 23_2.

The input and output controller 30 acquires the read data D2_1 and D2_2 respectively from the sensor modules 20_1 and 20_2. The input and output controller 30 alternately transmits the read data D2_1 and D2_2 according to the instruction signal S1. In an example illustrated in FIG. 3, a cycle Tout of an outputting timing is period equivalent to each of the reading period Tr1 and the reading period Tr2 of the respective sensor modules 20_1 and 20_2. An output D3 of the input and output controller 30 is the read data D2_1 from the time t0 to the time t1, and is the read data D2_2 from the time t1 to the time t2. After this, the read data D2_1 and D2_2, as described above, are transmitted alternately as the output D3 of the input and output controller 30 to the discrimination unit 40.

The discrimination unit 40 acquires the output D3 of the input and output controller 30 and associates the output of the input and output controller 30 with one of the sensor module 20_1 or the sensor module 20_2 based on information, that is held by the discrimination unit 40, indicating the output order of read data D2_1 and D2_2. The discrimination unit 40 associates data read from time t0 to the time t1 and data read from the time t1 to the time t2 respectively with sensor module 20_1 and sensor module 20_2. After this, by repeating the above-described processing, the discrimination unit 40 synthesizes the data associated with the sensor module 20_1 to obtain two-dimensional information such as two-dimensional image data associated with the sensor module 20_1. Similarly, the discrimination unit 40 synthesizes the data associated with the sensor module 20_2 to obtain two-dimensional image data associated with the sensor module 20_2. The discrimination unit 40 performs detection of the kind of the bank bill, discrimination between authentic and counterfeit bank bills, and the like by comparing the two-dimensional image data associated with the sensor modules 20_1 and 20_2 with the image previously registered.

As described above, the reading device 10 according to Embodiment 1 of the present disclosure outputs the read data D2_1 and D2_2, respectively generated by the sensor modules 20_1 and 20_2, sequentially in the order of the read data previously held by the discrimination unit 40. Accordingly, after associating the data output by the reading device 10 sequentially with the sensor module 20_1 and the sensor module 20_2, the discrimination unit 40 synthesizes the associated data to obtain the two-dimensional image data. Since there is no need to include a plurality of interfaces to correspond to each sensor modules, the reading device 10 has a simple structure compared to a reading device including interfaces for each of the sensor modules.

Embodiment 2

Although the sensor modules 20_1 and 20_2 of Embodiment 1 have the same unit conveyance distance, the sensor modules 20_1 and 20_2 may have different unit conveyance distances. Although the configuration of the identification device 1 according to Embodiment 2 of the present disclosure is the same as the configuration of the identification device 1 according to Embodiment 1, sensor modules 20_1 and 20_2 of Embodiment 2 have different unit conveyance distances. The case where a reading period Tr1 of the sensor module 20_1 is half as long as a reading period Tr2 of the sensor module 20_2, and that is, the case where the unit conveyance distance of the sensor module 20_1 is a half as long as the unit conveyance distance of the sensor module 20_2, is described as an example. The discrimination unit 40 holds the ratio of the unit conveyance distance of the sensor module 20_2 to the unit conveyance distance of the sensor module 20_1, in addition to information indicating the output order of the read data D2_1 and D2_2 to be output by the input and output controller 30.

Figure 4:
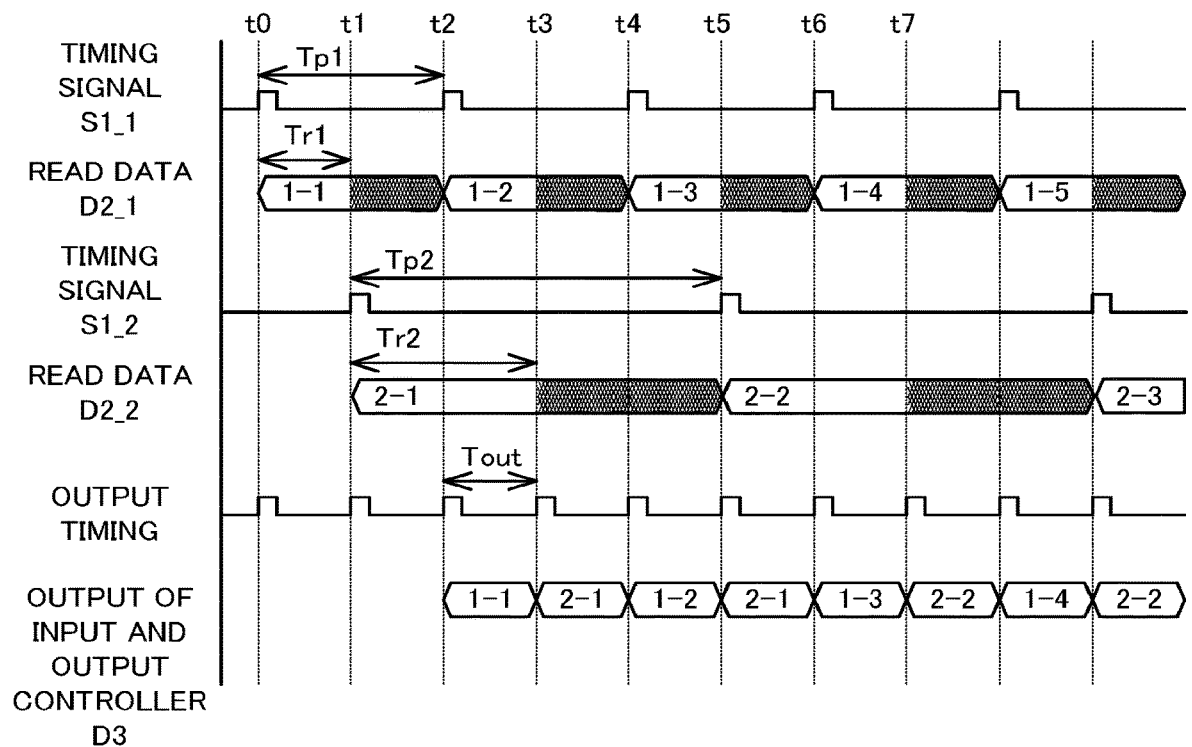
FIG. 4 is a timing chart indicating output of a reading device according to Embodiment 2 of the present disclosure.

The operation of the identification device 1 is described with reference to the timing chart illustrated in FIG. 4. The operation of the identification device 1 is described with reference to the case where the discrimination unit 40 transmits, to the input and output controller 30, the instruction signal S1 indicating alternately outputting of the read data of the sensor module 20_1 for one line and the read data of sensor module 20_2 for one line. The input and output controller 30 generates the timing signal S1_1 that is a pulse signal for a cycle Tp1 and the timing signal S1_2 that is a pulse signal for a cycle Tp2, based on the unit conveyance distances of the sensor modules 20_1 and 20_2 and in response to the instruction signal S1. The input and output controller 30 generates the timing signals S1_1 and S1_2 so that the timing of the rise of a pulse of the timing signal S1_1 and the timing of the rise of a pulse of the timing signal S1_2 differ from each other.

The input and output controller 30 generates the timing signal S1_1 having the cycle Tp1 twice as long as the reading period Tr1, and the timing signal S1_2 having the cycle Tp2 twice as long as the reading period Tr2. Since the unit conveyance distance of the sensor module 20_1 is half as large as the unit conveyance distance of the sensor module 20_2, and further the reading period Tr1 of the sensor module 20_1 is half as long as the reading period Tr2 of the sensor module 20_2, the cycle Tp1 of the timing signal S1_1 is half as long as the cycle Tp2 of the timing signal S1_2. Since the unit conveyance distance of the sensor module 20_1 is half as long as the unit conveyance distance of the sensor module 20_2, the input and output controller 30 repeatedly outputs the read data D2_2 by the first repetition number based on a minimum unit conveyance distance, that is the unit conveyance distance of the sensor module 20_1, and the unit conveyance distance of the sensor module 20_2. Specifically, the first repetition number is the value obtained by dividing the unit conveyance distance of the sensor module 20_2 by the minimum unit conveyance distance, that is to say, is the value two.

Upon detection of the rise of the pulse of the timing signal S1_1 at the time t0, the sensor module 20_1 starts the reading operation and outputs the read data D2_1. In FIG. 4, "1-1" indicated in the field of the read data D2_1 indicates the read data D2_1 that is based on the image data D1_1 for one line read by the first reading operation of the optical sensor IC 23_1. That is, the sensor module 20_1 sequentially outputs from the time t0 to the time t1, to the input and output controller 30, the read data D2_1 generated by the first reading operation. After this, similarly at the times t2, t4, and t6, the sensor module 20_1 starts the reading operation for every detection of the rise of the pulse of the timing signal S1_1 and outputs the read data D2_1. In FIG. 4, "1-2" indicated in the field of the read data D2_1 indicates the read data D2_1 that is based on the image data D1_1 for one line read by the second reading operation of the optical sensor IC 23_1. Similarly, "1-3", "1-4", and "1-5" indicated in the field of the read data D2_1 each indicate the read data D2_1 that are based on the image data D1_1 for one line read by the third, fourth, and fifth reading operations of the optical sensor IC23_1.

Upon detection of the rise of the pulse of the timing signal S1_2 at the time t1, the sensor module 20_2 starts the reading operation and outputs the read data D2_2. In FIG. 4, "2-1" indicated in the field of the read data D2_2 indicates the read data D2_2 that is based on the image data D1_2 for one line read by the first reading operation of the optical sensor IC 23_2. That is, the sensor module 20_2 sequentially outputs from the time t1 to the time t3, to the input and output controller 30, the read data D2_2 generated by the first reading operation. After this, similarly at the time t5, the sensor module 20_2 detects the rise of the pulse of the timing signal S1_2, starts the reading operation, and outputs the read data D2_2. In FIG. 4, "2-2" indicated in the field of the read data D2_2 indicates the read data D2_2 that is based on the image data D1_2 for one line read by the second reading operation of the optical sensor IC 23_2. Similarly, "2-3" indicated in the field of the read data D2_2 indicates the read data D2_2 that is based on the image data D1_2 for one line read by the third reading operation of the optical sensor IC23_2.

The input and output controller 30 acquires the read data D2_1 and the read data D2_2 respectively from the sensor module 20_1 and the sensor module 20_2, and stores the acquired data in a storage. The input and output controller 30 reads the read data D2_1 and D2_2 from the storage, and alternately outputs the read data D2_1 and D2_2 according to the instruction signal S1. A cycle Tout of an outputting timing of outputting the read data by the input and output controller 30 is equivalent to the reading period Tr1 of the sensor module 20_1. An output D3 of the input and output controller 30 is the read data D2_1 from the time t2 to the time t3, and is the read data D2_2 from the time t3 to the time t4. In addition, the output D3 of the input and output controller 30 is the read data D2_1 from time t4 to time t5. Since the reading operation of the optical sensor IC 23_2 is not terminated at the time t5, the input and output controller 30 outputs the previous read data D2_2, that is the read data D2_2 based on the image data D1_2 for one line read by the first reading operation of the optical sensor IC 23_2. In other words, the input and output controller 30 alternately outputs the read data D2_1 and D2_2, and outputs the same data twice for the read data D2_2.

The number of the read data D2_1 and number of read data D2_2 to be output by the input and output controller 30 while the object 8 is conveyed by the least common multiple of the unit conveyance distances are the same to each other. In addition, the number of each of the output read data D2_1 and D2_2 is obtained by dividing the least common multiple by the minimum value of the unit conveyance distance. That is, for the read data D2_2 generated by the sensor module 20_2 having the unit conveyance distance different from the minimum unit conveyance distance, the input and output controller 30 repeatedly outputs, for each the minimum unit conveyance distance, the previous line of the read data D2_2 until the conveyance distance of the object reaches the unit conveyance distance of the sensor module 20_2.

The discrimination unit 40, similar to the Embodiment 1, acquires the output D3 of the input and output controller 30 and associates the output of the input and output controller 30 with one of the sensor module 20_1 or the sensor module 20_2 based on information that is held by the discrimination unit 40, indicating the output order of read data D2_1 and D2_2. The discrimination unit 40 associates data read from time t0 to the time t1 and data read from the time t1 to the time t2 respectively with sensor module 20_1 and sensor module 20_2. After this, repeating the above-described processing, the discrimination unit 40 synthesizes the data associated with the sensor module 20_1 to obtain two-dimensional information such as two-dimensional image data associated with the sensor module 20_1.

The discrimination unit 40 synthesizes the data associated with the sensor module 20_2, excluding the data output repeatedly, and obtains the two-dimensional image data associated with the sensor module 20_2. The ratio, held by the discrimination unit 40, of the unit conveyance distance of the sensor module 20_2 to the unit conveyance distance of the sensor module 20_1 matches with the number of repetitions of the read data D2_2. For example, since the number of repetitions is two, the discrimination unit 40 deletes the even-numbered data of the read data D2_2 that are sequentially acquired, and synthesizes the remaining data to obtain the two-dimensional image data. The discrimination unit 40 performs detection of the kind of the bank bill, discrimination between authentic and counterfeit bank bills, and the like, by comparing the two-dimensional image data that are respectively associated with the sensor modules 20_1 and 20_2 and the image previously registered.

As described above, the reading device 10 according to Embodiment 2 of the present disclosure outputs the read data D2_2 generated by the sensor module 20_2 twice at a time. Acquiring output of the reading device 10 at a predetermined timing by the discrimination unit 40 is sufficient, and separately including interfaces is not required even when the sensor module 20_1 and the sensor module 20_2 have different unit conveyance distances. Since there is no need to include a plurality of interfaces to correspond to each of the sensor modules, the reading device 10 has a simple structure compared to a reading device including interfaces for the respective sensor modules.

Embodiment 3

The identification device 1 may include the sensor modules 20_1 and 20_2 having different resolutions from each other. The configuration of the identification device 1 according to Embodiment 3 of the present disclosure is the same as that of the identification device 1 according to Embodiment 1, except that the resolution of the sensor module 20_1 differs from the resolution of the sensor module 20_2. When outputting the read data D2_1 and D2_2, the input and output controller 30 performs interpolation operation during the output of a sensor module among the sensor modules so that the resolution of the sensor module is adjusted to the resolution of a sensor module, among the sensor modules, with the maximum resolution, specifically repeatedly outputting the preceding read data by the second repetition number. The resolution ratio, that is the resolution of the sensor module 20_1 to the resolution of the sensor module 20_2 and is to be a power of two, is described in an example as having the value two. Note that the sensor modules 20_1 and 20_2 have the same unit conveyance distance. In this case, the second repetition number is the value, two, obtained by dividing the maximum value of the resolution, that is, the resolution of the sensor module 20_1 by the resolution of the sensor module 20_2. The discrimination unit 40 holds information on a ratio of the resolution of the sensor module 20_1 to the resolution of the sensor module 20_2, in addition to information indicating the output order of the read data D2_1 and D2_2 that is output by the input and output controller 30.

Figure 5:
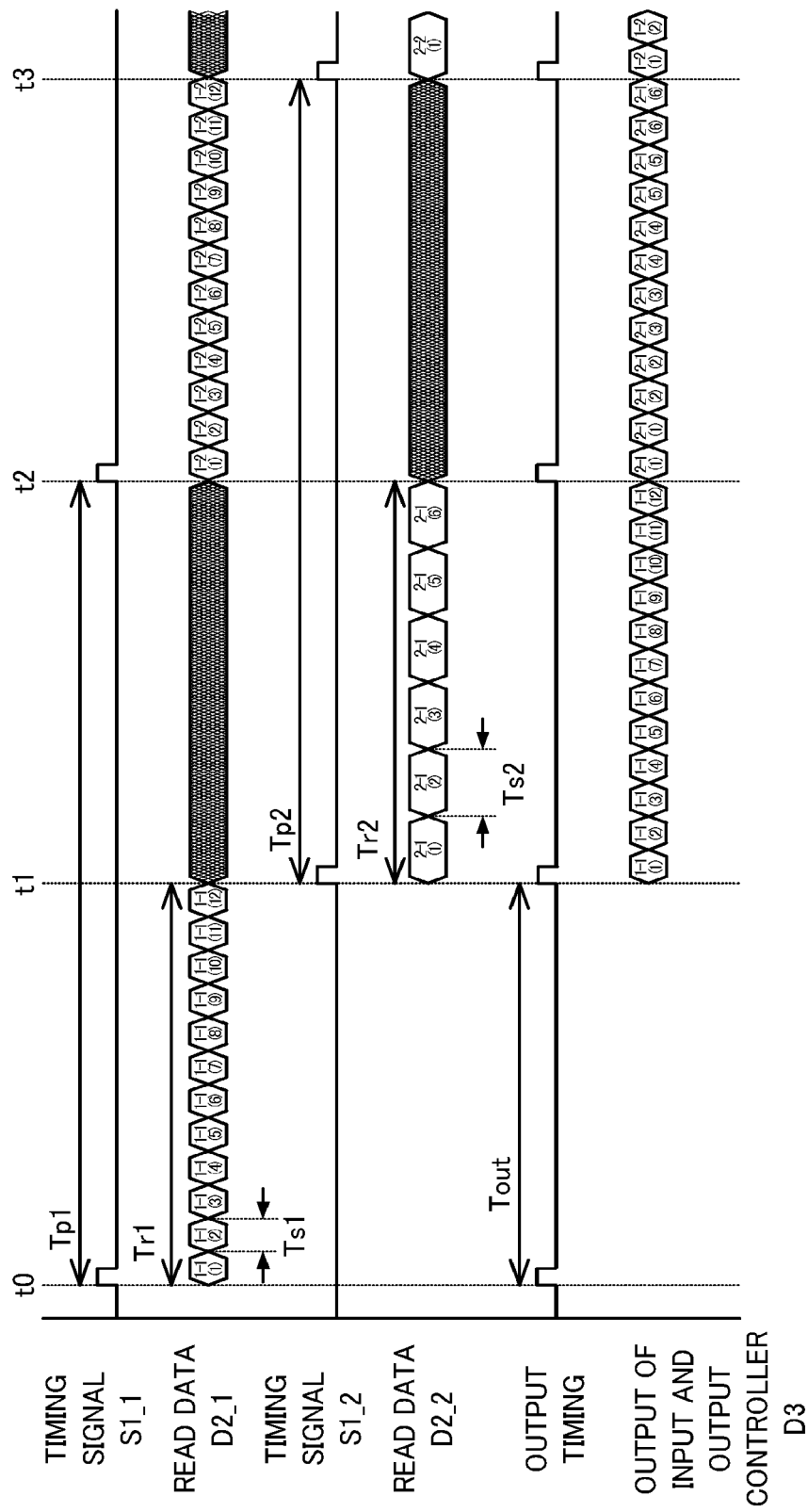
FIG. 5 is a timing chart indicating output of a reading device according to Embodiment 3 of the present disclosure.

The operation of the identification device 1 is described with reference to the timing chart illustrated in FIG. 5. The operation of the identification device 1 is described, as an example, with reference to the case where the discrimination unit 40 transmits, to the input and output controller 30, the instruction signal S1 indicating alternately outputting of the read data of the sensor module 20_1 for one line and the read data of sensor module 20_2 for one line. The input and output controller 30 generates the timing signal S1_1 that is a pulse signal for a cycle Tp1 and the timing signal S1_2 that is a pulse signal for a cycle Tp2, based on the unit conveyance distances of the sensor modules 20_1 and 20_2 and in response to the instruction signal S1. The input and output controller 30 generates the timing signals S1_1 and S1_2 so that the timing of the rise of a pulse of the timing signal S1_1 and the timing of the rise of a pulse of the timing signal S1_2 differ from each other. Similar to Embodiment 1, the cycle Tp1 and the cycle Tp2 have the same length.

The sensor module 20_1 operates in the same manner as that of Embodiment 1. The optical sensor IC 23_1 starts the reading operation at the time t0. The read data D2_1 based on the image data D1_1 for one line read by the first reading operation of the optical sensor IC 23_1 is indicated, in the field of the read data D2_1 illustrated in FIG. 5, as unit data "1-1 (1)" to "1-1 (12)" that are data for each of the sensor elements. Similarly, the read data D2_1 based on the image data D1_1 for one line read by the second reading operation of the optical sensor IC 23_1 is indicated as unit data "1-2 (1)" to "1-2 (12)" that are data for each of the image pickup elements.

The sensor module 20_1 outputs in this order, to the input and output controller 30, the unit data "1-1 (1)" to "1-1 (12)" constituting the read data D2_1 that is generated by the first reading operation from the time t0 to the time t1. After this, the sensor module 20_1 outputs sequentially, to the input and output controller 30, the unit data "1-2 (1)" to "1-2 (12)" constituting the read data D2_1 that is generated by the second reading operation from the time t2 to the time t3. The sensor module 20_1 repeats the above-described operation.

The sensor module 20_2 operates in the same manner as that of Embodiment 1. The optical sensor IC 23_2 starts the reading operation at the time t1. The read data D2_2 based on the image data D1_2 for one line read by the first reading operation of the optical sensor IC 23_2 is indicated, in the field of the read data D2_2 illustrated in FIG. 5, as unit data "2-1 (1)" to "2-1 (6)" that are data for each of the sensor elements. Similarly, the read data D2_2 based on the image data D1_2 for one line read by the second reading operation of the optical sensor IC 23_2 is unit data "2-2 (1)" to "2-2 (6)" that are data for each of image pickup elements. In FIG. 5, only the first unit data 2_2 (1) is indicated.

The sensor module 20_2 outputs, to the input and output controller 30, the unit data "2-1 (1)" to "2-1 (6)" constituting the read data D2_2 that is generated by the first reading operation from the time t1 to the time t2. A reading period Ts2 of a sensor element included in the sensor module 20_2 is twice as long as a reading period Ts1 of the sensor element included in the sensor module 20_1. The sensor module 20_2 repeats the above-described operation.

The input and output controller 30 sequentially acquires the unit data "1-1 (1)" to the unit data "1-1 (12)" constituting the read data D2_1 from the sensor module 20_1 and the unit data "2-1 (1)" to "2-1 (6)" constituting the read data D2_2 from the sensor module 20_2, and stores the acquired unit data in storage. The input and output controller 30 reads the read data D2_1 and D2_2 from the storage according to the instruction signal S1, and outputs the read data D2_1 and D2_2 alternately. The cycle Tout of an outputting timing at which the read data is output by the input and output controller 30 is set at the same period as the reading period Tr1 of the sensor module 20_1. The input and output controller 30 outputs the unit data "1-1(1)" to "1-1(12)" constituting the read data D2_1 in this order from the time t1 to the time t2. Since the resolution of the sensor module 20_1 is twice as large as the resolution of the sensor module 20_2, the input and output controller 30 outputs the unit data "2-1 (1)" to "2-1 (6)" constituting the read data D2_2 twice each from the time t2 to the time t3.

The discrimination unit 40, similar to Embodiment 1, acquires the output D3 of the input and output controller 30 and associates the output of the input and output controller 30 with one of the sensor module 20_1 or the sensor module 20_2 based on information indicating the output order of read data D2_1 and D2_2 held by the discrimination unit 40. The discrimination unit 40 associates data read from time t0 to the time t1 and data read from the time t1 to the time t2 respectively with sensor module 20_1 and sensor module 20_2. After this, by repeating the above-described processing, the discrimination unit 40 synthesizes the data associated with the sensor module 20_1 to obtain two-dimensional information such as two-dimensional image data associated with the sensor module 20_1.

The discrimination unit 40 synthesizes data associated with the sensor module 20_2, excluding the data output repeatedly, to obtain two-dimensional image data associated with the sensor module 20_2. The ratio, held by the discrimination unit 40, of the resolution of the sensor module 20_1 to the resolution of the sensor module 20_2 matches the number of output repetitions of unit data constituting the read data D2_2. For example, since the number of repetitions is two, the discrimination unit 40 deletes the even-numbered data of the unit data constituting the read data D2_2 acquired sequentially, synthesizes the remaining data, and obtains the two-dimensional image data. The discrimination unit 40 performs detection of the kind of the bank bill, discrimination between authentic and counterfeit bank bills, and the like, by comparing the two-dimensional image data that are respectively associated with the sensor modules 20_1 and 20_2 and the image previously registered.

As described above, the reading device 10 according to Embodiment 3 of the present disclosure outputs the unit data constituting the read data D2_2 generated by the sensor module 20_2 twice at a time. Acquiring output of the reading device 10 at a predetermined timing by the discrimination unit 40 is sufficient, and separately including interfaces is not required even when the sensor module 20_1 and the sensor module 20_2 have different resolution. Since there is no need to include a plurality of interfaces to correspond to each sensor modules, the reading device 10 has a simple structure compared to a reading device including interfaces for the respective sensor modules.

Embodiment 4

Figure 6:
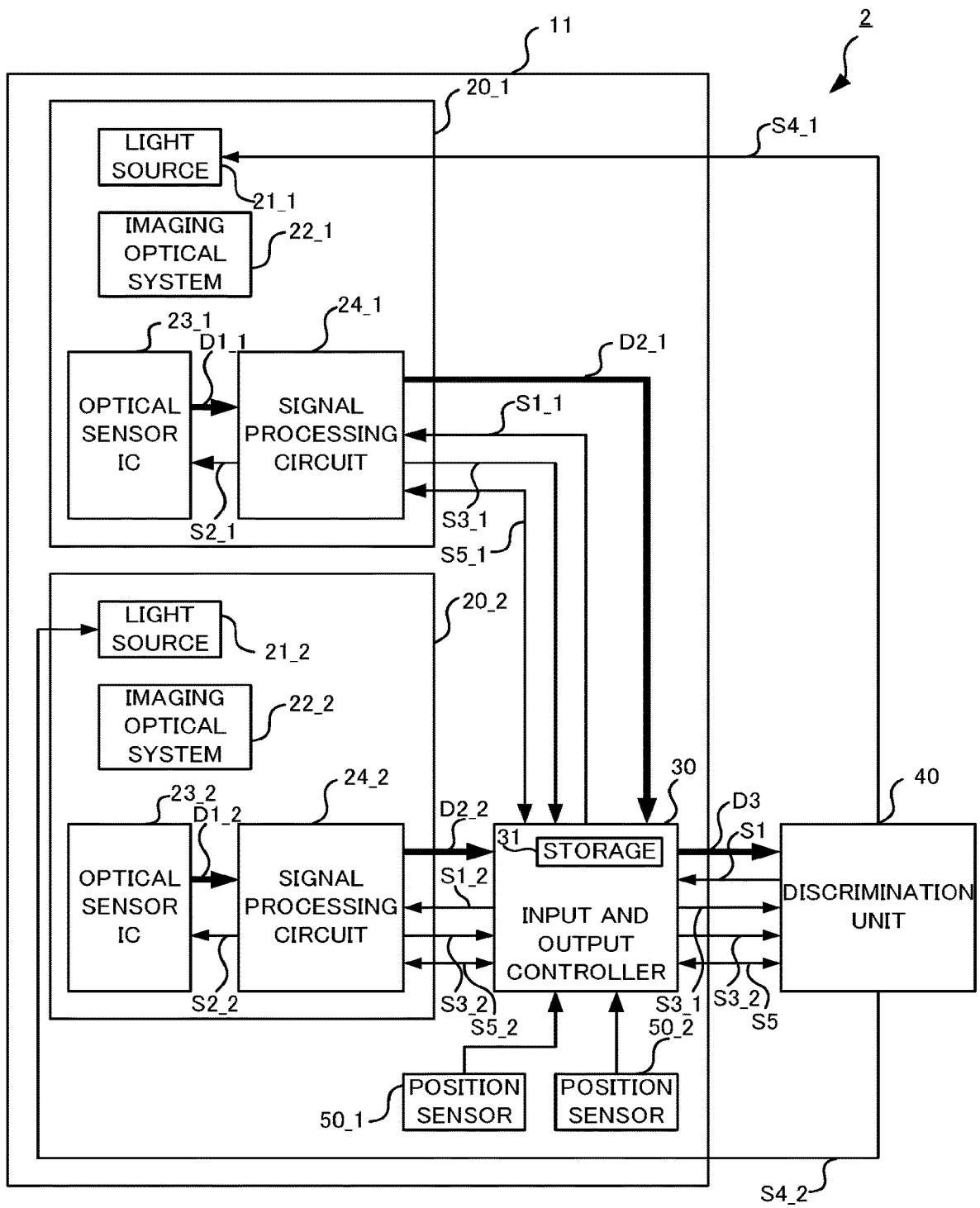
FIG. 6 is a block diagram illustrating a detailed example configuration of an identification device according to Embodiment 4 of the present disclosure.

When a conveyance speed of the object 8 is not constant, the outputting timings of the sensor modules 20_1 and 20_2 vary. An identification device in which data generated by the sensor modules 20_1 and 20_2 are sequentially stored in the storage and the data are read from the storage at the timings corresponding to the conveyance speed of the object 8, is described as Embodiment 4. An identification device 2 illustrated in FIG. 6, instead of the reading device 10 included in the identification device 1 according to Embodiment 1, includes a reading device 11. The reading device 11 includes, in addition to the configuration of the reading device 10 according to Embodiment 1, storage 31 and position sensors 50_1 and 50_2 that detect the arrival of the object 8. The storage 31 includes a buffer memory. The read data D2_1 and D2_2 respectively generated by the sensor modules 20_1 and 20_2 are sequentially stored in the storage 31. The input and output controller 30 calculates the conveyance speed of the object 8 from the detection results of the position sensors 50_1 and 50_2, reads the read data D2_1 and D2_2 from the storage 31 at the acquisition timing corresponding to the conveyance speed of the object 8 and a predetermined amount of line deviation, and outputs the read data.

Figure 7:
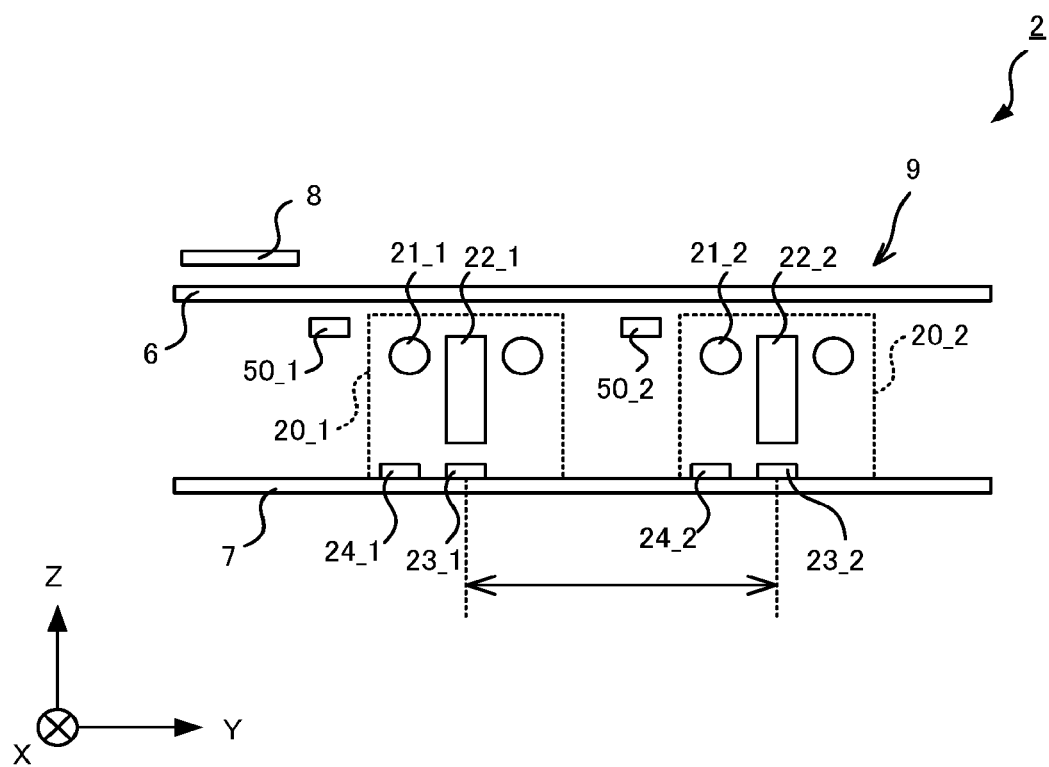
FIG. 7 is a diagram illustrating an example arrangement of sensor modules and position sensors according to Embodiment 4.

As illustrated in FIG. 7, the sensor modules 20_1 and 20_2 and the position sensors 50_1 and 50_2 are arranged facing the conveyance path where the object 8 is conveyed. The sensor modules 20_1 and 20_2 are arranged in similarly to the manner illustrated in FIG. 2. The position sensors 50_1 and 50_2 are respectively positioned on negative direction sides of the Y-axis of the sensor modules 20_1 and 20_2. The object 8 passes vertically above the position sensor 50_1, the sensor module 20_1, the position sensor 50_2, and the sensor module 20_2 in this order. The position sensors 50_1 and 50_2 transmit the time when the object 8 is detected to the input and output controller 30. Since previously holding information on the distance between the position sensors 50_1 and 50_2, the input and output controller 30 detects the conveyance speed of the object 8 from the sensor module 20_1 to the sensor module 20_2 based on the distance between the position sensors 50_1 and 50_2 and the times obtained from the position sensors 50_1 and 50_2.

The acquisition timing at which the input and output controller 30 acquires the read data from the storage 31 is determined based on the arrangement positions of the sensor modules 20_1 and 20_2 and the conveyance speed of the object 8 between the sensor modules 20_1 and 20_2. In addition, the acquisition timing is adjusted in response to arrangement information including the position on the conveyance path 9 at which the object 8 passes, and the phase difference in a conveyance direction between the sensor modules 20_1 and 20_2 and on the amount of line deviation. For example, the input and output controller 30 calculates the timing of arrival of the object 8 to the sensor module 20_2 based on the arrangement positions of the sensor modules 20_1 and 20_2 and the conveyance speed of the object 8 between the sensor modules 20_1 and 20_2. Then, the input and output controller 30 acquires the read data D2_1 and D2_2 from the storage 31 at the timing of the arrival of the object 8 to the sensor module 20_2. The input and output controller 30 adjusts cycles of the timing signals S1_1 and S1_2, and the cycle of the timing of acquiring the read data D2_1 and D2_2 from the storage 31 based on the detected conveyance speed. Accordingly, the input and output controller 30 acquires the read data D2_1 and D2_2 from the storage 31 at the acquisition timing of the adjusted cycle, and outputs the acquired read data D2_1 and D2_2 to the discrimination unit 40.

As described above, since the reading device 11 according to Embodiment 4 of the present disclosure acquires the read data D2_1 and D2_2 from the storage 31 at the timing corresponding to the conveyance speed of the object 8, the input and output controller 30 can output the read data D2_1 and D2_2 at a constant outputting timing even in the case where objects 8 have different conveyance speed based on the kinds of the objects 8, for example.

Embodiment 5

Although the input and output controller 30 in the above-described embodiments sequentially acquires the read data from the sensor modules 20_1 and 20_2, the input and output controller 30 may acquire the read data concurrently from the sensor modules 20_1 and 20_2. An identification device including an input and output controller 30 that acquires the read data D2_1 and D2_2 concurrently from the sensor modules 20_1 and 20_2 is described as Embodiment 5.

Figure 8:
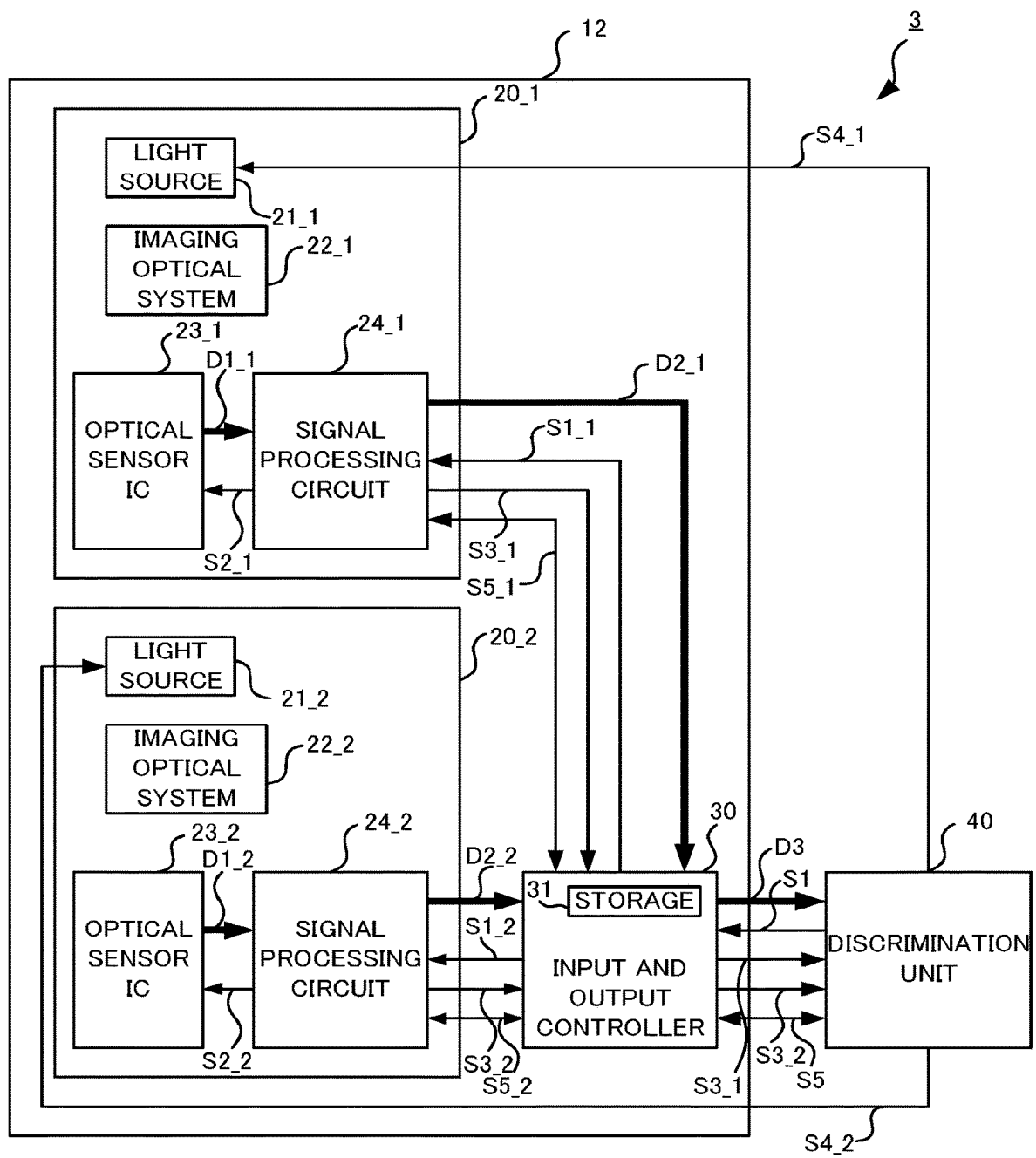
FIG. 8 is a block diagram illustrating a detailed example configuration of an identification device according to Embodiment 5 of the present disclosure.

An identification device 3 illustrated in FIG. 8, in addition to the configuration of the identification device 1 according to Embodiment 1 illustrated in FIG. 1, includes the storage 31. The input and output controller 30 acquires the read data D2_1 and D2_2 concurrently from the sensor modules 20_1 and 20_2, and stores the acquired read data in the storage 31. In addition, the input and output controller 30 reads the read data D2_1 and the read data D2_2 from the storage 31 and outputs the read data D2_1 and the read data D2_2 sequentially. Note that the outputting speed of the input and output controller 30 is determined to be falling in the range with an upper limit obtained by multiplying the maximum value of the outputting speed of the sensor modules 20_1 and 20_2 and the number of the sensor modules 20_1 and 20_2.

Figure 9:
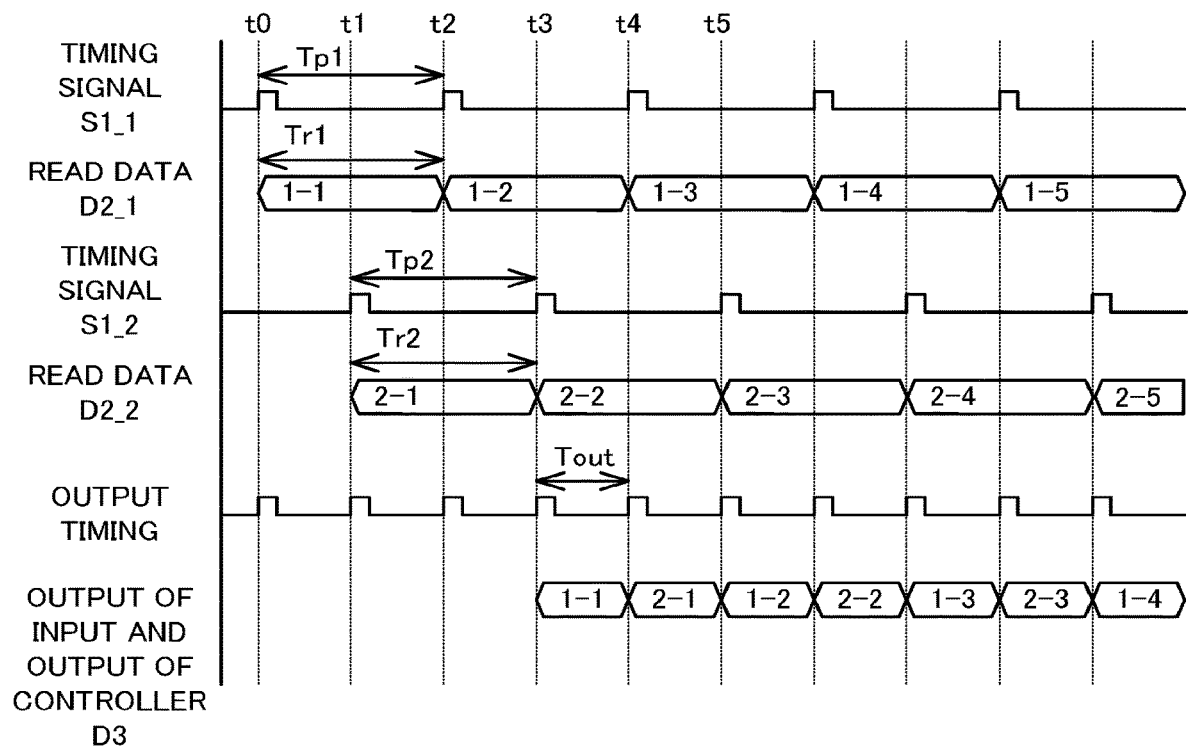
FIG. 9 is a timing chart indicating output of a reading device according to Embodiment 5.

The operation of the identification device 3 including the above configuration is described with reference to the flow-chart illustrated in FIG. 9. The operation of the identification device 3 is described as an example with reference to the case where the discrimination unit 40 transmits, to the input and output controller 30, the instruction signal S1 indicating alternately outputting of the read data for one line from the sensor module 20_1 and the read data for one line from the sensor module 20_2. Similar to Embodiment 1, the sensor modules 20_1 and 20_2 have the same unit conveyance distance and the reading period Tr1 of the sensor module 20_1 and the reading period Tr2 of the sensor module 20_2 are equal to each other.

The optical sensor IC 23_1 starts the reading operation at the time t0 and outputs the read data D2_1. In FIG. 9, "1-1" indicated in the field of the read data D2_1 indicates the read data D2_1 based on the image data D1_1 for one line read by the first reading operation of the optical sensor IC 23_1. That is, the sensor module 20_1 sequentially outputs from the time t0 to the time t2, to the input and output controller 30, the read data D2_1 generated by the first reading operation. After this, similarly at the times t2 and t4, the sensor module 20_1 starts the reading operation for every detection of the rise of the pulse of the timing signal S1_1 and outputs the read data D2_1. In FIG. 9, "1-2" indicated in the field of the read data D2_1 indicates the read data D2_1 that is based on the image data D1_1 for one line read by the second reading operation of the optical sensor IC 23_1. Similarly, "1-3", "1-4", and "1-5" indicated in the field of the read data D2_1 each indicate the read data D2_1 that are based on the image data D1_1 for one line read by the third, fourth, and fifth reading operations of the optical sensor IC23_1.

Upon detection of the rise of the pulse of the timing signal S1_2 at the time t1, the sensor module 20_2 starts the reading operation and outputs the read data D2_2. In FIG. 9, "2-1" indicated in the field of the read data D2_2 indicates the read data D2_2 that is based on the image data D1_2 for one line read by the first reading operation of the optical sensor IC 23_2. That is, the sensor module 20_2 sequentially outputs from the time t1 to the time t3, to the input and output controller 30, the read data D2_2 generated by the first reading operation. After this, similarly at the times t3 and t5, the sensor module 20_2 starts the reading operation for every detection of the rise of the pulse of the timing signal S1_2, and outputs the read data D2_2. In FIG. 9, "2-2" indicated in the field of the read data D2_2 indicates the read data D2_2 that is based on the image data D1_2 for on line read by the second reading operation of the optical sensor IC 23_2. Similarly, "2-3", "2-4", and "2-5" indicated in the field of the read data D2_2 each indicate the read data D2_2 that are based on the image data D1_2 for one line read by the third, fourth, and fifth reading operations of the optical sensor IC23_2.

The input and output controller 30 acquires the read data D2_1 and read data D2_2 respectively from the sensor module 20_1 and sensor module 20_2. The input and output controller 30 concurrently stores the acquired read data D2_1 and D2_2 in the storage 31. The input and output controller 30, after the time t3, alternately outputs, according to the instruction signal S1, the read data D2_1 and the read data D2_2 acquired from the storage 31.

Similar to Embodiment 1, the discrimination unit 40 reads output D3 of the input and output controller 30, and associates the data read by the sensor modules 20_1 and 20_2 in the order indicated by the instruction signal S1 that is output to the input and output controller 30, of the sensor module 20_1 and the sensor module 20_2 in this order. The discrimination unit 40 associates data read from time t3 to the time t4 and data read from the time t4 to the time t5 respectively with sensor module 20_1 and sensor module 20_2. After this, repeating the above-described processing, the discrimination unit 40 synthesizes the data associated with the sensor module 20_1 to obtain two-dimensional image data associated with the sensor module 20_1. Similarly, the discrimination unit 40 synthesizes the data associated with the sensor module 20_2 to obtain two-dimensional image data associated with the sensor module 20_2. The discrimination unit 40 performs identification of the object 8 based on the two-dimensional image data that are associated with the sensor modules 20_1 and 20_2.

With the storage 31, the input and output controller 30 can acquires the read data D2_1 and D2_2 concurrently from the sensor modules 20_1 and 20_2. This can eliminate unnecessary waiting time, and further increase the outputting speed of the input and output controller 30 within the range with an upper limit obtained by multiplying the maximum value of the outputting speed of the sensor modules 20_1 and 20_2 and the number of the sensor modules 20_1 and 20_2.

While acquiring the read data D2_1 from the sensor module 20_1, the input and output controller 30 can also acquire the read data D2_2 from the sensor module 20_2. Thus, although the sensor modules 20_1 and 20_2 have overlapping outputting periods for the read data D2_1 and D2_2, the input and output controller 30 can acquire the read data D2_1 and D2_2 and output the read data D2_1 and D2_2 to the discrimination unit 40.

As described above, in the reading device 12 according to Embodiment 5 of the present disclosure, the input and output controller 30 acquires the read data D2_1 and D2_2 concurrently from the sensor modules 20_1 and 20_2. Therefore, although the sensor modules 20_1 and 20_2 have the overlapping outputting periods for the read data D2_1 and D2_2, the input and output controller 30 can acquire the read data D2_1 and D2_2. In addition, the output speed of the input and output controller 30 can be increased within a range having the upper limit that is obtained by multiplying the number of sensor modules 20 with the maximum value of the output speed of the sensor modules 20.

Embodiment 6

Figure 10:
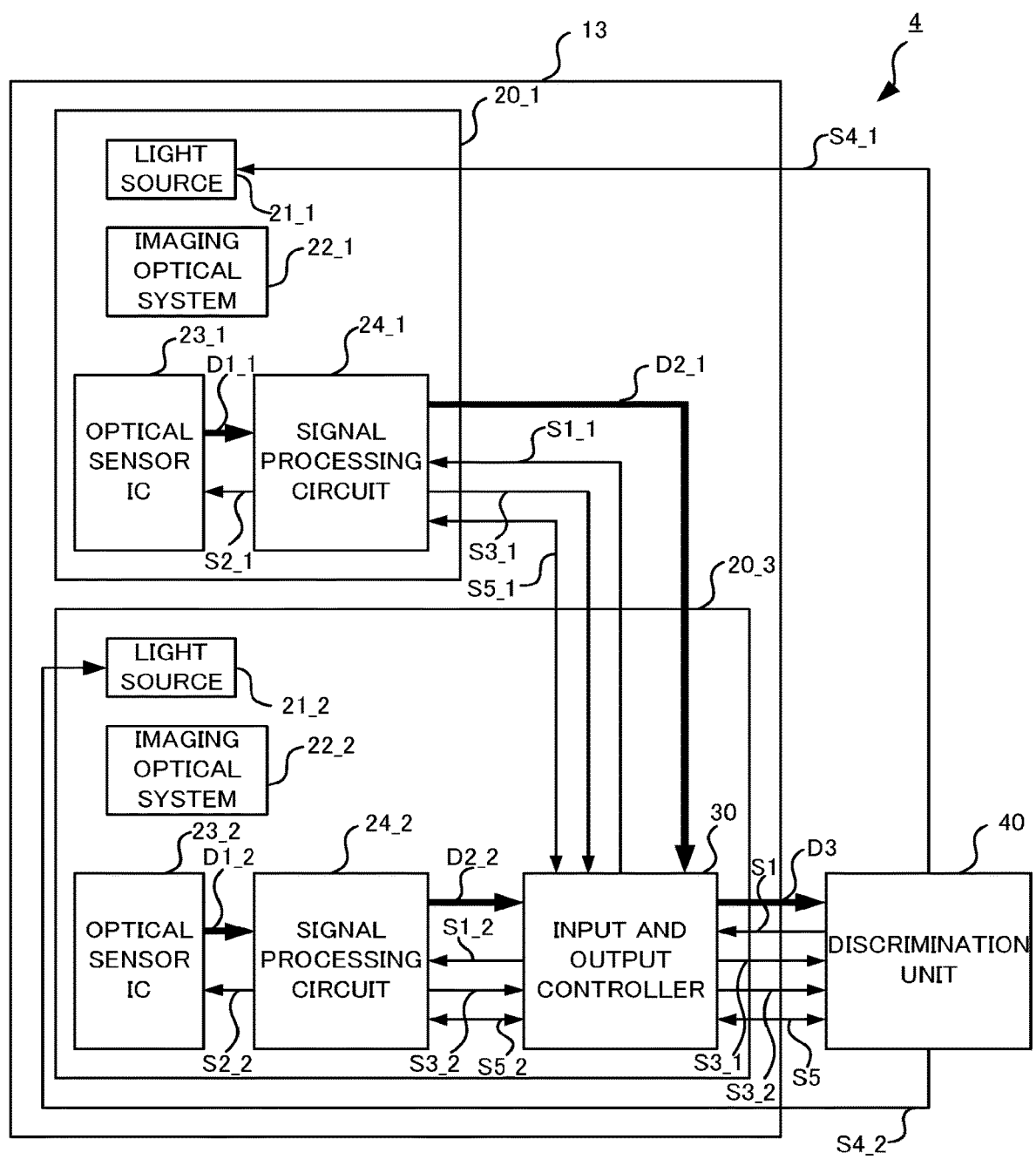
FIG. 10 is a block diagram illustrating an example configuration of an identification device according to Embodiment 6 of the present disclosure.

Although, the above-described embodiments have the input and output controller 30 that is provided independently from the sensor modules 20_1 and 20_2, the input and output controller 30 may be built in either one of the sensor modules 20_1 and 20_2. An identification device having a sensor module with an input and output controller 30 built therein is described as Embodiment 6. An identification device 4 according to Embodiment 6 illustrated in FIG. 10 includes a reading device 13 instead of the reading device 10 included in the identification device 1 according to Embodiment 1. The reading device 13 includes a sensor module 20_3 instead of the sensor module 20_2. The sensor module 20_3 includes the input and output controller 30 in addition to the configuration of the sensor module 20_2. The input and output controller 30 operates similarly as that in Embodiment 1.

As described above, the reading device 13 according to Embodiment 6 of the present disclosure including the input and output controller 30 that is built in the sensor module 20_3 can provide the compact identification device 4.

Embodiment 7

Figure 11:
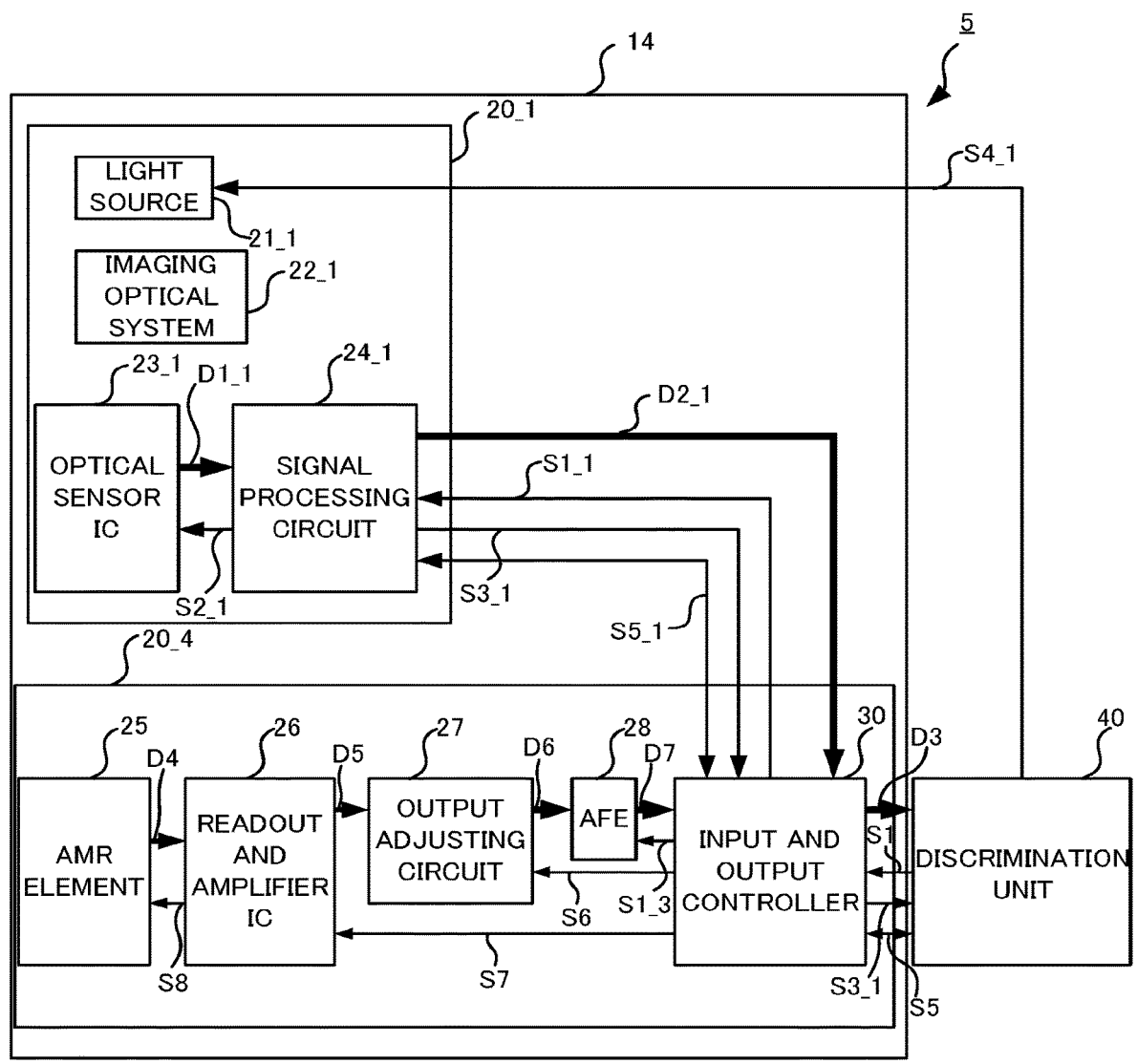
FIG. 11 is a block diagram illustrating an example configuration of an identification device according to Embodiment 7 of the present disclosure.

A sensor module is not limited to an optical sensor module and can be selected from any sensors that acquire identification information of the object. An identification device including an optical sensor and a magnetic sensor is described as an example of Embodiment 7. An identification device 5 according to Embodiment 7 illustrated in FIG. 11 includes a reading device 14 instead of the reading device 10 included in the identification device 1 according to Embodiment 1. The reading device 14 includes, instead of the sensor module 20_2, a sensor module 20_4 that reads magnetic characteristics of the object 8. The sensor module 20_4 is a magnetic sensor having the input and output controller 30 built therein.

The sensor module 20_4 includes an anisotropic-magneto-resistive (AMR) element 25 that detects the change of the magnetic field of the reading area and electrically outputs the detection result as the change in a resistance value, a readout and amplifier IC 26 that reads the resistance value variation D4 to be output by the AMR element 25, and amplifies the read variation of the resistance value D4 to generate amplified data D5, an output adjusting circuit 27 that performs signal processing with respect to the amplified data D5 to generate the adjusted data D6, AFE 28 that performs A-D conversion on the adjusted data D6 and transmits the A-D converted data as the read data D7 to the input and output controller 30, and the input and output controller 30.

The input and output controller 30 generates timing signals S1_1 and S1_3 based on the unit conveyance distances of the sensor modules 20_1, 20_4 and in response to an instruction signal S1. Furthermore, the input and output controller 30 transmits the timing signals S1_1 and S1_3 respectively to a signal processing circuit 24_1 of the sensor module 20_1 and AFE 28 of the sensor module 20_4. In addition, the input and output controller 30 transmits timing signals S6 and S7 synchronized with the timing signal S1_3 respectively to the output adjusting circuit 27 and the readout and amplifier IC 26. The output adjusting circuit 27 and the readout and amplifier IC 26 operate in response respectively to the timing signals S6 and S7. The readout and amplifier IC 26 outputs a timing signal S8 synchronized with the timing signal S7 to the AMR element 25 and acquires a resistance value variation D4 of the AMR element 25 that is output in response to the timing signal S8.

The sensor module 20_1 that is a contact image sensor (CIS) and the sensor module 20_4 that is a magnetic sensor sometimes have different unit conveyance distances, resolutions, and the like. With different unit conveyance distances, the input and output controller 30 and the discrimination unit 40 operate in a similar manner as in Embodiment 2. In addition, with different resolutions, the input and output controller 30 and the discrimination unit 40 operate in a similar manner as in Embodiment 3.

As described above, according to the reading device 14 according to Embodiment 7 of the present disclosure, the discrimination unit 40 need not include separate interfaces even in the case of inclusion of the sensor module 20_1 that is the CIS and the sensor module 20_4 that is the magnetic sensor. Since there is no need to include a plurality of interfaces to correspond to each sensor module, the reading device 14 has a simple structure compared to a reading device including interfaces for each of the sensor modules.

Figure 12:
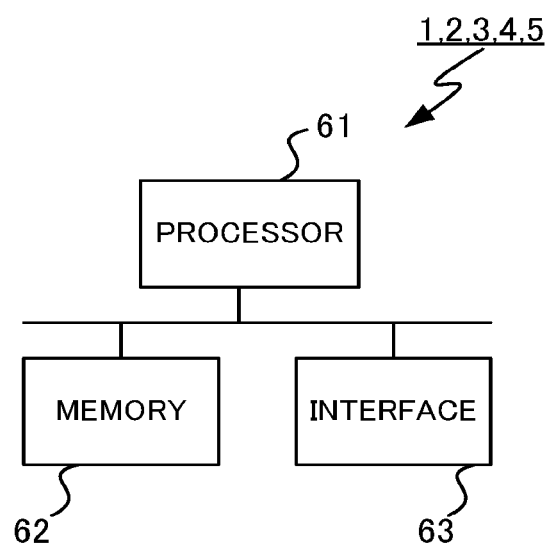
FIG. 12 is a diagram illustrating an example configuration of hardware of identification device of the embodiments.

FIG. 12 is a diagram illustrating an example configuration of hardware of identification device of the embodiments. Identification devices 1 to 5 include a processor 61, a memory 62, and an interface 63 as a hardware configuration to control various components. Functions of the devices are achieved by the processor 61 executing a program that is stored in the memory 62. The interface 63 connecting the devices to establish communication therebetween, may include several kinds of interfaces where necessary. Although FIG. 12 illustrates an example in which the identification devices 1 to 5 each have a single processor 61 and a single memory 62, a plurality of the processors 61 and a plurality of the memories 62 may cooperate with one another to achieve each function.

Furthermore, the above hardware configuration and flowchart are one example, and freely-selected modifications and adjustments are possible.

The central portion that includes the processor 61, the memory 62, and interface 63 for performing control processing can be obtained by use of a general computer system without using a dedicated system. For example, the identification devices 1 to 5 may be configured to execute the above-described operation by storing a computer program for executing the above-described operations on a computer readable recording medium (such as a flexible disk, a CD-ROM, a DVD-ROM), distributing the computer readable recording medium, and installing the above computer program in a computer. Alternatively, the identification devices 1 to 5 may also be configured by previously storing the above computer program in a storage device included in the server device on a communication network, and downloading to the general computer.

In addition, in cases such as where the function of the identification devices 1 to 5 is achieved by the distributed or cooperative action of an operating system (OS) and an application program, only the application program portion may be stored in a recording medium or a recording device.

A computer program can be superimposed on a carrier wave to distribute the computer program via a communication network. For example, the computer program may be posted on a bulletin board (BBS, Bulletin Board System) on a communication network, and the computer program may be distributed via the communication network. The computer program may be started and executed in the same manner as other application programs under the control of the OS, so that the above-described processing may be executed.

The above-described embodiments may arbitrarily be appropriately combined with each other. Any sensor modules 20_1 and 20_2 may be used as long as the sensors can read the identification information of the object. As an example of the sensor modules 20_1 and 20_2, a visible-light sensor module, a magnetic sensor module, a thickness sensor module, an infrared sensor module, an ultraviolet (UV) sensor module, and the like can be used.

Control of turning ON or turning OFF of the LEDs included in the optical sensor IC 23_1 and IC 23_2 may be performed from the outside of the identification devices 1 to 5.

Although the input and output controller 30 of the above-described embodiments generates the timing signals S1_1 and S1_2 in response to the instruction signal S1 indicating an output order of the read data, the input and output controller 30 may generate the timing signals S1_1 and S1_2 based on the predetermined output order of the read data. In this case, the input and output controller 30 and the discrimination unit 40 each hold information on the predetermined output order of the read data.

The configuration of the discrimination unit 40 is not limited to the above examples, and not holding by the discrimination unit 40 the information indicating the output order of the read data D2_1 and D2_2 to be output by the input and output controller 30 is permissible.

The arrangement of sensor modules 20_1 and 20_2 is not limited to the above-described examples. The arrangement position of the sensor modules 20_1 and 20_2 can be freely selected as long as the identification information of the object 8 can be read. For example, the sensor modules 20_1 and 20_2 may be arranged facing each other in the Z-axis direction, with the conveyance path 9 where the object 8 is conveyed, interposed therebetween. The storage 31 may be provided independently from the input and output controller 30.

Although the timing signal of the above-described embodiments is a pulse signal, the waveform of the timing signal can be appropriately selected, as long as the signal is capable of commanding the sensor modules 20_1 and 20_2 to start of the reading operation. Alternatively, the sensor modules 20_1 and 20_2 may start the reading operation upon detection of the fall of a pulse.

The cycle Tp1 of the timing signal S1_1 and the cycle Tp2 of the timing signal S1_2 according to the above-described embodiments are described as examples. When the minimum value of the unit conveyance distance of one of the sensor modules is multiplied by a natural number of two or more to have a result that matches with a unit conveyance distance of the remaining sensor modules, the input and output controller 30 generates a timing signal so that a result obtained by multiplying a timing signal cycle that has the shortest cycle with a natural number of two or more, matches with a timing signal cycle of the remaining sensor modules. Then, the input and output controller 30 repeatedly outputs the read data by the number corresponding to the natural number.

Although the case where the object 8 is moved while the sensor modules 20_1 and 20_2 are fixed is described as an example of conveyance, the meaning of "conveyance" includes all relative movement of the object 8 with respect to the sensor modules 20_1 and 20_2. For example, the case where the sensor modules 20_1 and 20_2 are conveyed by a known conveyance mechanism while the object 8 is fixed is also included.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2017-195210, filed on Oct. 5, 2017, the entire disclosure of which is incorporated by reference herein.

REFERENCE SIGNS LIST 1, 2, 3, 4, 5 Identification device
6 Transparent plate
7 Substrate
8 Object
9 Conveyance path
10, 11, 12, 13, 14 Reading device
20, 20_1, 20_2, 20_3, 20_4 Sensor module
21_1, 21_2 Light source
22_1, 22_2 Imaging optical system
23_1, 23_2 Optical sensors IC
24_1, 24_2 Signal processing circuit
25 AMR element
26 Readout and amplifier IC
27 Output adjusting circuit
28 AFE
30 Input and output controller
31 Storage
40 Discrimination unit
50_1, 50_2 Position sensor
61 Processor
62 Memory
63 Interface
D1_1, D1_2 Image data
D2_1, D2_2, D7 Read data
D3 Output
D4 Variation of the resistance value
D5 Amplified data
D6 Adjusted data
S1 Instruction signal
S1_1, S1_2, S1_3, S6, S7, S8 Timing signal
S2_1, S2_2 Start signal
S3_1, S3_2 LED control signal
S4_1, S4_2 Connection control signal
S5, S5_1, S5_2 Serial communication signal group

The invention claimed is:

1. A reading device, comprising:

sensor modules, each configured to, in response to a corresponding timing signal, read identification information held by an object that is to be read and generate a read data item, the timing signal being transmitted to the corresponding sensor module, and an input and output controller configured to transmit the timing signal to the corresponding sensor module based on a unit conveyance distance determined for the corresponding sensor module and a predetermined order of the sensor modules, acquire the read data item generated by the corresponding sensor module, and output the read data item that corresponds to the corresponding sensor module in the predetermined order, the timing signal commanding start of reading the object each time the object is conveyed over the unit conveyance distance of the corresponding sensor module, wherein each of the sensor modules includes a linear sensor array arranged in a direction perpendicular to a conveyance direction, and is configured to obtain identification information, including at least one of optical information and magnetic information of the object as two-dimensional information, by reading the object with the sensor array, each time the object is conveyed over the unit conveyance distance, at least one of the sensor modules differs from a remaining sensor module in unit conveyance distance that corresponds to a period necessary for reading the object for one line, and upon outputting the read data items respectively received from the sensor modules, the input and output controller is configured to output, multiple times, a same line of the read data item received from the remaining sensor module having a unit conveyance distance that is different from a minimum unit conveyance distance, each time the object is conveyed over the minimum unit conveyance distance until a conveyance distance of the object reaches the unit conveyance distance of the remaining sensor module, by a previously set reading timing that commands the sensor modules such that a unit conveyance distance of the remaining sensor module is an integral multiple of the minimum unit conveyance distance, the minimum unit conveyance distance being a standard, and a unit conveyance distance of one of the sensor modules having the minimum unit conveyance distance.

2. A reading device, comprising:

sensor modules, each configured to, in response to a corresponding timing signal, read identification information held by an object that is to be read and generate a read data item, the timing signal being transmitted to the corresponding sensor module, and an input and output controller configured to transmit the timing signal to the corresponding sensor module based on a unit conveyance distance determined for the corresponding sensor module and a predetermined order of the sensor modules, acquire the read data item generated by the corresponding sensor module, and output the read data item that corresponds to the corresponding sensor module in the predetermined order, the timing signal commanding start of reading the object each time the object is conveyed over the unit conveyance distance of the corresponding sensor module, wherein each of the sensor modules includes a linear sensor array arranged in a direction perpendicular to a conveyance direction, and is configured to obtain identification information, including at least one of optical information and magnetic information of the object as two-dimensional information, by reading the object with the sensor array, each time the object is conveyed over the unit conveyance distance, at least one of the sensor modules differs from a remaining sensor module in unit conveyance distance that corresponds to a period necessary for reading the object for one line, and upon outputting the read data items respectively received from the sensor modules, the input and output controller is configured to set a reading timing that commands the sensor modules such that a unit conveyance distance of the remaining sensor module is an integral multiple of a minimum unit conveyance distance, the minimum unit conveyance distance being a standard, and a unit conveyance distance of one of the sensor modules having the minimum unit conveyance distance.

3. A reading device, comprising:

sensor modules, each configured to, in response to a corresponding timing signal, read identification information held by an object that is to be read and generate a read data item, the timing signal being transmitted to the corresponding sensor module, and an input and output controller configured to transmit the timing signal to the corresponding sensor module based on a unit conveyance distance determined for the corresponding sensor module and a predetermined order of the sensor modules, acquire the read data item generated by the corresponding sensor module, and output the read data item that corresponds to the corresponding sensor module in the predetermined order, the timing signal commanding start of reading the object each time the object is conveyed over the unit conveyance distance of the corresponding sensor module, wherein each of the sensor modules includes a linear sensor array arranged in a direction perpendicular to a conveyance direction, and is configured to obtain identification information, including at least one of optical information and magnetic information of the object as two-dimensional information, by reading the object with the sensor array, each time the object is conveyed over the unit conveyance distance, at least one of the sensor modules differs from a remaining sensor module in unit conveyance distance that corresponds to a period necessary for reading the object for one line, and upon outputting the read data items respectively received from the sensor modules, the input and output controller is configured to output, multiple times, a same line of the read data item of the remaining sensor module, each time the object is conveyed over a minimum unit conveyance distance until a conveyance distance of the object reaches the unit conveyance distance, the minimum unit conveyance distance being a standard, and a unit conveyance distance of one of the sensor modules having the minimum unit conveyance distance.

4. The reading device according to claim 1, wherein at least one of the sensor modules differs from the remaining sensor module in resolution of the sensor array, and upon outputting the read data items respectively received from the sensor modules, the input and output controller is further configured to perform interpolation such that a resolution of the remaining sensor module among the sensor modules matches a maximum resolution of a sensor module among the sensor modules.

5. The reading device according to claim 4, wherein
the at least one of the sensor modules differs from the remaining sensor module in resolution of the sensor array, and
a ratio of the resolution of the sensor module having the maximum resolution to the resolution of the remaining sensor module is an integer.

6. The reading device according to claim 4, wherein
the at least one of the sensor modules differs from the remaining sensor module in resolution of the sensor array, and
the ratio of the resolution of the sensor module having the maximum resolution to the resolution of the remaining sensor module is a power of two.

7. The reading device according to claim 1, wherein
the input and output controller is further configured to, after receiving the read data items respectively output from the sensor modules and upon outputting the received read data items, temporarily store the received read data items in an intermediate buffer memory, and adjust timing of outputting the stored read data items from the intermediate buffer memory based on a predetermined amount of line deviation previously calculated from arrangement information and a conveyance speed of the object on a conveyance path.

8. The reading device according to claim 1, wherein
the input and output controller is further configured to, after receiving the read data items respectively output from the sensor modules and upon outputting the received read data items, temporarily store the received read data items in an intermediate buffer memory, and adjust timing of outputting the stored read data items from the intermediate buffer memory based on a position of the object detected by a position sensor disposed near at least one of the sensor modules, arrangement information of the object on a conveyance path, a phase difference between the sensor modules in a conveyance direction calculated from a conveyance speed, and an amount of line deviation calculated from the position of the object.

9. The reading device according to claim 1, wherein
the input and output controller is further configured to receive the read data items respectively output from the sensor modules, store the read data items in an intermediate buffer memory, and output the stored read data items at a speed greater than a speed of outputting the read data items by the sensor modules.

10. A reading device, comprising:
sensor modules, each configured to, in response to a corresponding timing signal, read identification information held by an object that is to be read and generate a read data item, the timing signal being transmitted to the corresponding sensor module, and
an input and output controller configured to transmit the timing signal to the corresponding sensor module based on a unit conveyance distance determined for the corresponding sensor module and a predetermined order of the sensor modules, acquire the read data item generated by the corresponding sensor module, and output the read data item that corresponds to the corresponding sensor module in the predetermined order, the timing signal commanding start of reading the object each time the object is conveyed over the unit conveyance distance of the corresponding sensor module, wherein
one of the sensor modules differs from a remaining sensor module in unit conveyance distance, and
the input and output controller is configured to output, multiple times, a particular read data item generated by a particular sensor module among the sensor modules other than a sensor module with a longest unit conveyance distance.

11. The reading device according to claim 10, wherein
the sensor modules each have sensor elements that read the identification information included in the object and generate unit data items,
the read data item includes the unit data items, and
the input and output controller acquires the read data item including the unit data items and outputs the unit data items included in the read data item generated by the sensor module.

12. The reading device according to claim 11, wherein
one of the sensor modules differs from the remaining sensor module in resolution, the resolution being the number of the sensor elements included in the sensor module in a main scanning direction, and
the input and output controller repeatedly outputs the unit data items included in the read data item generated by a sensor module among the sensor modules other than a sensor module having the maximum resolution.

13. The reading device according to claim 1, further comprising:
a storage to hold the read data items respectively generated by the sensor modules, wherein
the input and output controller is further configured to acquire the read data items from the storage.

14. The reading device according to claim 13, wherein
the input and output controller is further configured to calculate an arrival timing of the object at each of the sensor modules based on arrangement positions of the sensor modules and conveyance speed of the object between the sensor modules, and acquire the read data items from the storage at the arrival timing of the object to each of the sensor modules.

15. The reading device according to claim 14, further comprising:
position sensors arranged at positions different from each other, and each configured to detect arrival, at a predetermined position, of the object that is conveyed,
wherein the conveyance speed is calculated based on the arrangement positions of the position sensors and the timings of detecting with the position sensors the arrival of the object at the predetermined position.

16. The reading device according to claim 13, wherein
the read data items respectively generated by the sensor modules are concurrently held by the storage, and
the input and output controller is further configured to output the held read data items at a speed greater than a speed of outputting the read data items by the sensor modules.

17. The reading device according to claim 1, wherein
at least one of the sensor modules is an optical sensor module that reads the identification information including an optical property of the object, and
at least another one of the sensor modules is a magnetic sensor module that reads the identification information including a magnetic property of the object.

18. An identification device, comprising:
the reading device according to claim 1, and
a discrimination circuit configured to read the read data items output by the reading device, associate the read data items with the respective sensor modules, and identify the object based on the read data items that are associated with the respective sensor modules.

19. The identification device according to claim 18, wherein
the discrimination circuit is further configured to transmit an instruction signal indicating the predetermined order to the reading device,
the input and output controller included in the reading device is further configured to transmit the timing signals to the respective sensor modules based on the unit conveyance distances respectively determined for the sensor modules, in response to the instruction signal received from the discrimination unit, acquire the read data items respectively generated by the sensor modules, and output the read data items corresponding to the respective sensor modules in an order of the sensor modules indicated by the instruction signal.

* * * * *